United States Patent [19]

Queeney

[11] 3,995,944
[45] Dec. 7, 1976

[54] DIGITAL LINE-OF-SIGHT DEFLECTION CONTROL DEVICE

[75] Inventor: Paul J. Queeney, Baltimore, Md.

[73] Assignee: Westinghouse Electric Corporation, Pittsburgh, Pa.

[22] Filed: Feb. 28, 1975

[21] Appl. No.: 554,274

[52] U.S. Cl. .............................. 350/285; 350/289; 350/301

[51] Int. Cl.² ...................... G02B 5/08; G02B 7/18

[58] Field of Search .......... 350/285, 289, 299, 301; 356/5

[56] References Cited

UNITED STATES PATENTS

| | | | |
|---|---|---|---|
| 2,638,035 | 5/1953 | MacGeorge et al. | 350/289 |
| 3,059,539 | 10/1962 | Meade | 350/289 |
| 3,290,503 | 12/1966 | Staufenberg et al. | 350/285 |
| 3,349,174 | 10/1967 | Warschauer | 350/285 |
| 3,504,182 | 3/1970 | Pizzurro et al. | 356/5 |
| 3,514,183 | 5/1970 | Rabedeau | 350/285 |
| 3,544,201 | 12/1970 | Fowler et al. | 350/285 |
| 3,565,514 | 2/1971 | Bate et al. | 350/285 |
| 3,615,135 | 10/1971 | Frazer | 356/5 |

Primary Examiner—John K. Corbin
Assistant Examiner—Richard A. Rosenberger
Attorney, Agent, or Firm—D. F. Straitiff

[57] ABSTRACT

Apparatus is disclosed for digitally deflecting a line-of-sight (LOS) axis of an energy beam, or an optical LOS axis of an optical train, in each of two mutually orthogonal directions of deflective sweep. The apparatus utilizes a series of mirrors, each of which is independently pivotable about two orthogonally related linear pivot axes. Each of the mirrors doubles the deflection movement of the preceding mirror so that binary values of deflection of the LOS are generated by selective control of the mirrors of the series. Positioning of each mirror is provided by a "four position-two orthogonal axis actuator" which forcibly drives the mirror between any one to any other of four positions consisting of combinations of two pivotal deflection positions about each of two mutually orthogonal linear pivot axes.

10 Claims, 6 Drawing Figures

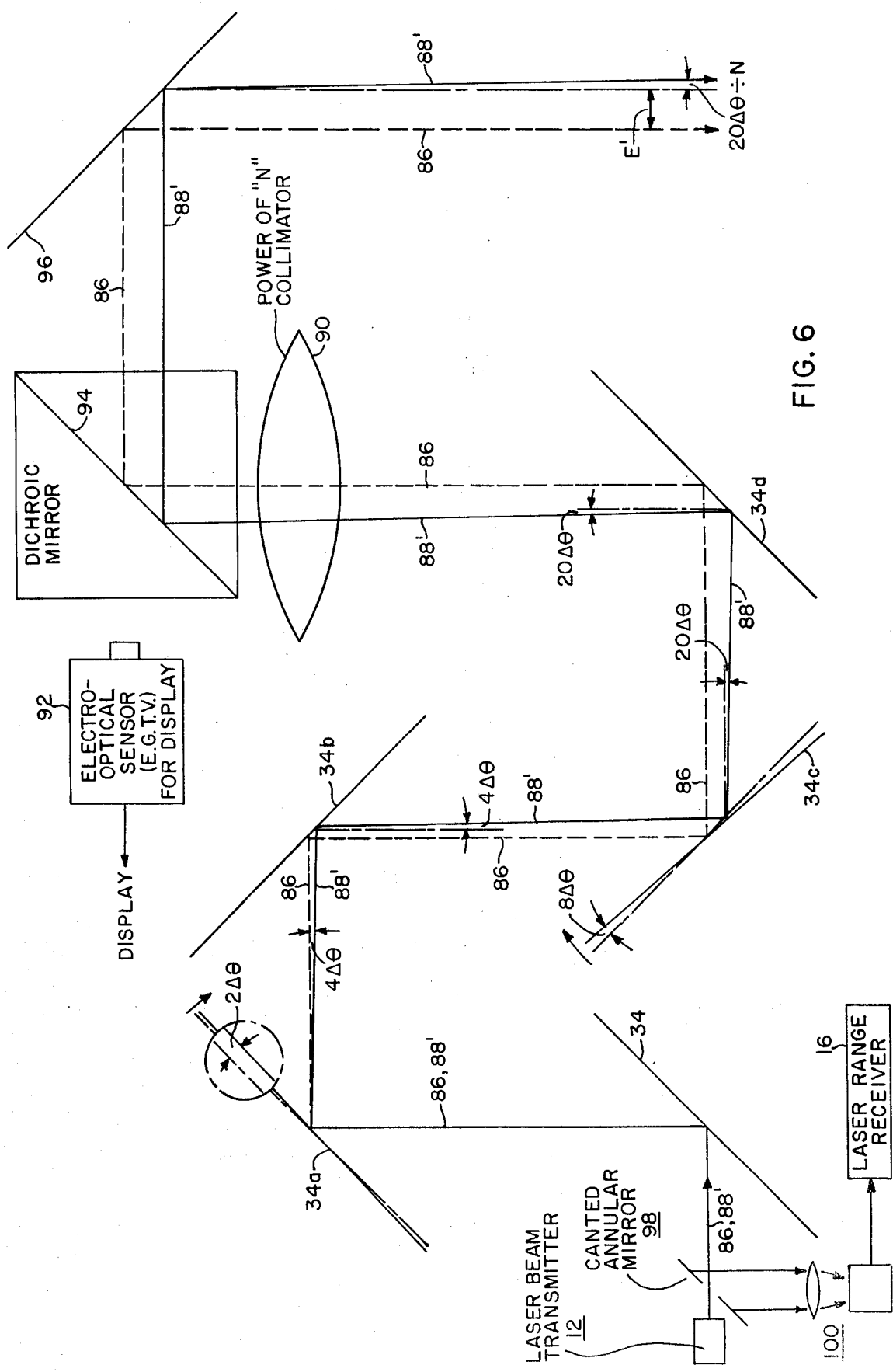

DIGITAL LINE-OF-SIGHT DEFLECTION CONTROL DEVICE

BACKGROUND OF THE INVENTION

Definitions

The following terms as used in this specification and the appended claims shall have meanings as follows:

"Line-of-sight" (sometimes abbreviated "LOS axis") is intended to have generic meaning covering both: (A) the axis of an energy beam, and (B) an optical line-of-sight axis through an optical train.

"Virtual axis (or axes) of deflection of an LOS axis", or simple "Virtual axis of deflection" has reference to one or both, as the case may be, of two mutually orthogonal virtual axes which are effectively present in conjunction with the disclosed series of pivotal mirrors. These virtual axes are present as the result of the combined effects of operation of all the individual mirrors of the series of pivotal mirrors, as will become apparent as the description proceeds. Since the locations of these axes do not coincide with any structure which appears in the drawing, the modifier word "virtual" has been used as the name given to them.

"Pivotal deflection about a linear pivot axis" or simply "pivotal deflection" has reference to the individual operation of the series of pivotal mirrors of the apparatus disclosed and claimed herein. Unless otherwise qualified, it is intended to have generic meaning covering both the cases of: (A) deflection of a mirror about a linear pivot axis which passes through the center of the mirror, and (B) deflection of a mirror about a pivot axis which is displaced by a distance of separation from the center of the mirror.

Field of the Invention

The present invention relates to apparatus for digitally deflecting a line-of-sight (LOS) axis in each of two mutually orthogonal directions of deflective sweep. Such apparatus finds use in optical train equipment, energy beam projection equipment, and the like. The invention is of especial utility in applications requiring deflection control actions at rates of sixty times per second or faster.

Description of the Prior Art

The prior art apparatus for two degrees of freedom digital control of deflection of an LOS axis at control action rates of 60 times per second and faster have heretofore been constructed of individual deflection stations which could only produce deflection about one virtual axis of deflection. One example of such apparatus is disclosed in U.S. Pat. No. 3,520,595 to R. L. Treuthart entitled "Optical Beam Angle Generator" wherein the individual deflection station employs the principle of frustration of internal reflection interfaces to deflect the LOS axis about a single virtual axis of deflection. The interface is frustrated by bringing an adjacent optic media element into proximity with what is initially a total internal reflection interface. Another example of such apparatus is disclosed in U.S. Pat. No. 3,544,202 to V. J. Fowler entitled "Beam-Deflection Apparatus." There, the individual deflection stations employ piezoelectric action to deflect the LOS axis about a single virtual axis of deflection. With these prior art approaches, deflection about two virtual axes of deflection could only be accomplished by employing two such apparatuses in series. This has the disadvantage of introducing twice the optical loss. Also, these approaches inherently have relatively tight design limitations. In the case of the approach of frustrating an internal reflection, the maximum deflection obtainable by a deflection station is constrained by the critical angle required for total internal reflection. In the case of the approach of employing piezoelectric action, the maximum deflection obtainable by a deflection station is constrained by limits of dimensional changes of piezoelectric materials.

There is also a continuing need for improvement in such apparatus for deflecting an LOS axis in order to enable ease of manufacture, and lower production cost.

SUMMARY OF THE INVENTION

Apparatus in provided for digital control of deflection of a line-of-sight (LOS) axis in each of two mutually orthogonal directions of deflective sweep. The apparatus utilizes a series of mirrors, each of which is individually pivotable about two orthogonally related axes. This, in turn, permits the LOS axis to be swept along X and Y directions of a two dimensional field-of-view. Each mirror is positioned to reflect the LOS axis to the next succeeding mirror of the series in right-angled, zig-zag, LOS axis segments. Each mirror is selectively positionable between pivotal deflection limit stops about each of its pivot axes, and the angular distance between the limits increases as a power of two (2) among the successive mirrors of the series. Stated another way, the angular distances are proportional to the binary number system bit position values of a binary word.

This capability for positioning each mirror about two orthogonally related axes is provided by an individual four position-two orthogonal axis drive mechanism associated with that mirror. The mechanism forcibly drives the mirror between any of four positions consisting of combinations of two pivotal deflection positions about each of two mutually orthogonal linear pivotal axes. The first and second linear pivot axes are in mutually orthogonal attitudes which provide the X-direction and the Y-direction of deflective sweep. The four position—two orthogonal axis mechanism is constructed from two spring biased solenoid and armature arm actuators of the type commonly employed as switch contact actuators. Each spring biased, solenoid and armature arm actuator operates on the principle of relative movement about a linear pivot axis between: (A) the solenoid and its associated housing; and (B) the armature arm. The two spring biased, solenoid and armature arm actuators are mechanically coupled in series with one another with their respective pivot axes in a mutually orthogonal relationship.

Individual bit signals of a binary number word for control of deflection in the X-direction of sweep are applied to those spring biased, solenoid and armature arm actuators that have their pivot axes oriented to cause an X-direction of sweep. Individual bit signals of another binary number word for controlling Y-direction of sweep are applied to those spring biased, solenoid and armature arm actuators that have their pivot axes oriented to cause a Y-direction of sweep. The motion in the direction of X and Y deflective sweep is equivalent to about a pair of orthogonally related virtual axes of deflection of the LOS axis.

Each four position-two orthogonal axis drive mechanism moves the mirror connected thereto between pivotal deflection limit stop positions through an angle $K\Delta\theta$, where K is a constant which varies as a power of two (2) along the mirrors of the series. One of the pivotal axis of a mirror, one of the pivotal deflection limit stop positions about each of the pivotal deflection axes of each mirror is established as the reference or optical train boresight reference position of the mirror. The other position is established as the pivotally deflected position of the mirror. Assume that $\Delta\theta$ is the minimum angular distance of pivotal mirror deflection required for a given application. A first mirror station is provided having an angular distance between its pivotal deflection limit stops of $\Delta\theta$. Then a second mirror is provided which is positionable at either zero or $2\Delta\theta$ deflection positions about each of its pivotal deflection axes. This gives four precise conditions of mirror movement about each of the mutually orthogonal virtual axes of deflection, as shown in the following table:

Table 1

Total of Mirror Pivotal Deflection Movement
(About One Virtual Axis of Deflection, Only)
Which May be Generated by Two Mirror stations

| Mirror | Position | Mirror 2 Movement | Mirror | Position | Mirror 2 Movement | Total of Mirrors Movement |
|---|---|---|---|---|---|---|
| 1 | 1 | 0 | 2 | 1 | 0 | 0 |
| 1 | 2 | Δ | 2 | 1 | 0 | Δ |
| 1 | 1 | 0 | 2 | 2 | 2Δ | 2Δ |
| 1 | 2 | Δ | 2 | 2 | 2Δ | 3Δ |

The above construction is extended until the required field-of-view is provided. For example, three (3) mirrors provide eight (8) positions about each axis, out to $7\Delta\theta$ in each axis. Four (4) mirrors provide sixteen positions in each axis, out to $15\Delta\theta$, and so forth. The angular distance between pivotal deflection limit stops for the first mirror, $\Delta\theta$, can be made as small as required for any particular application, and the number of mirrors increased to cover any desired field-of-view.

BRIEF DESCRIPTION OF THE DRAWINGS

FIG. 4 is a block diagram which diagrammatically depicts the operational interrelationships between the processor and command generator unit of FIG. 1, and the mirror and four position-two orthogonal axis drive assembly of FIGS. 2 and 3;

FIG. 6 is a conceptual schematic like FIG. 5, but with the individual mirror and four position-two orthogonal axis drive assemblies in a different set of energization conditions.

DESCRIPTION OF THE PREFERRED EMBODIMENT

Figure 1:
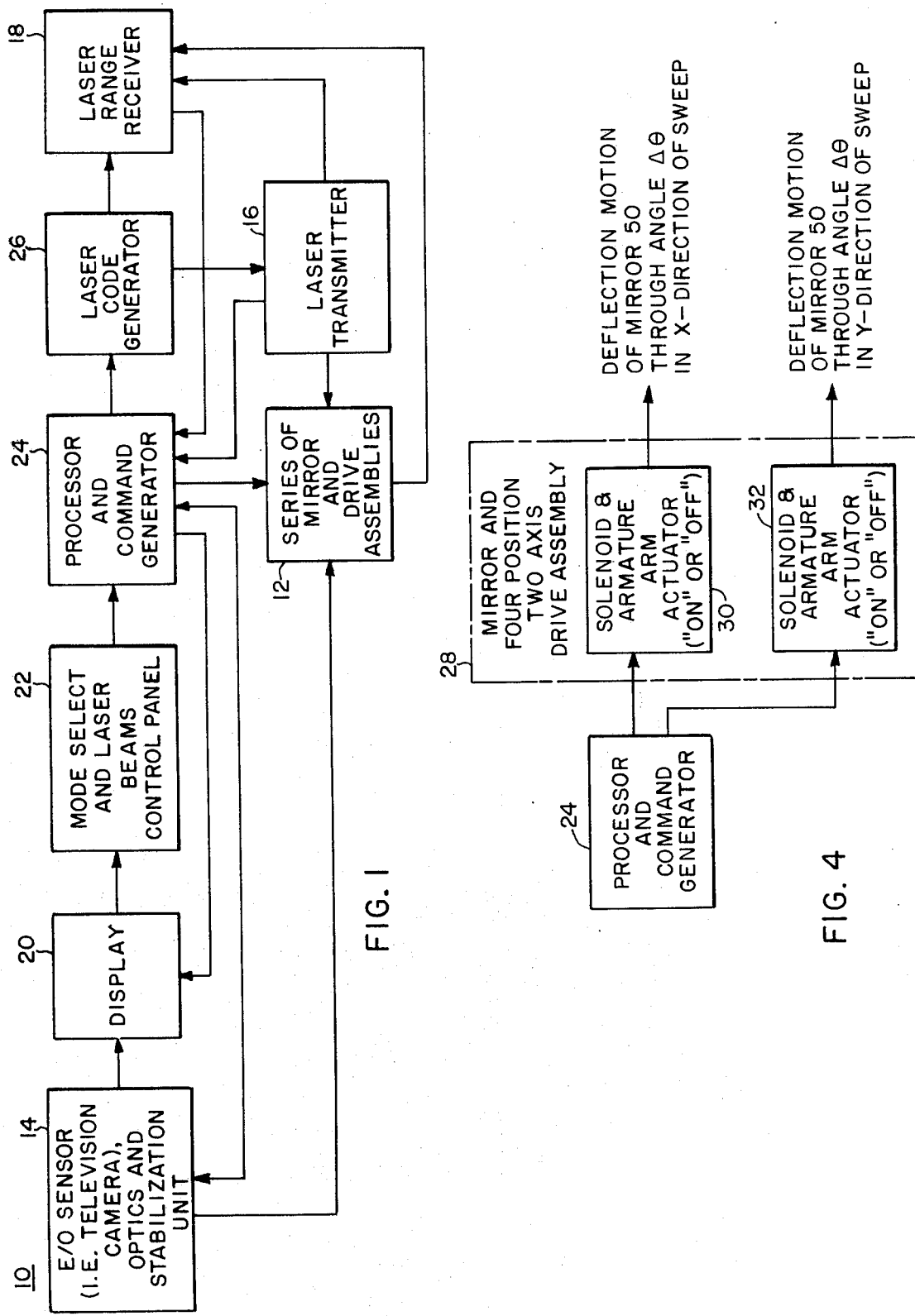
FIG. 1 is a block diagram of a laser multiple target designation system which employs apparatus of the present invention for digitally deflecting an LOS axis in each of two mutually orthogonal directions of deflective sweep.

Referring now to the drawing, and more particularly to FIG. 1, there is illustrated a target designation system 10 constructed in accordance with the present invention. System 10 is used in designating targets for two or more "laser-guided" weapons by projecting pencil beams of laser energy at the targets. A laser-guided weapon is one that uses a semi-active guidance system to "home in" on laser energy reflected from a ground target. The weapons, which would be launched from an aircraft, are controlled by the human operator by means of his control of line-of-sight (LOS) axes of laser energy beams pointed at ground targets. Target designation system 10 would be operated by a human operator who is a member of the air crew of the launching aircraft or another aircraft accompanying the launching aircraft.

For illustrative purposes it will be assumed that the smallest desired angular displacements of mirror pivotal deflection, $\Delta\theta$, is equal to ½ milliradian after output collimation. An operational embodiment of system 10 would typically have seven (7) control mirrors (although for simplicity of explanation the detailed drawings herein contain a fewer number). These would provide line-of-sight coverage of 127.5 milliradians or slightly greater than $7°$ both in the X-direction and in the Y-direction of a two dimensional field-of-view of the target designation system.

The description will first be directed to those elements of system 10 which are involved with the optical train operation of series 12 of mirrors and drive assemblies. After that is concluded, the description will proceed to the elements of system 10 which are involved with operation series 12 in other than optical train functions.

The elements which are involved with the optical train operation of series 12 include a suitable E/O sensor, optics and stabilization unit 14. The E/O sensor of unit 14 may be a television camera. Unit 14, namely the organization of a camera or other E/O sensor, optics and stabilization means is well known, and in and of itself is not novel. Also included in this group of elements are a laser radiant energy beam transmitter or beam projector 16 and a laser range receiver 18. The television camera or other suitable E/O sensor is chosen to pick up a video picture of the field-of-view for display to the human operator. The laser transmitter 16 and the laser range receiver 18 share the optics and stabilization means of unit 14, as will be better understood as the description proceeds. Laser transmitter 16 and laser range receiver 18 comprise a laser energy beam echo ranging system. The range to some object in the path of the energy beam is derived from the time delay between the moment of transmission of a laser beam and the time the reflective energy is returned to the receiver. There are operative interconnections between series 12 and each of: (A) the E/O sensor, optics and stabilization unit 14; (B) laser beam transmitter 16; and (C) laser range receiver 18.

The elements of system 10, which are involved with the other-than-optical train functions of series 12 of mirrors and drive assemblies, consist of: a display 20, a mode select and laser beam control panel 22, a processor and command generator unit 24, and a laser code generator 26. Display 20 may be a television display for presenting the human operator the scene picked up by the electro-optical sensor of unit 14. Display 20 also presents to the human operator symbols which are generated by processor and command generator unit 24 and are electronically imprinted upon the screen of the display. These symbols are related to target tracks and operator designations of targets. The mode select and laser beams control panel 22 includes a control panel for use by the human operator controlling the following functions: (A) selection of the modes of operation of system 10; (B) designation of targets seen on the display; and (C) introduction into the processor 24 of datum point information regarding targets and reference points seen in the field of the display. Processor and command generator unit 24 consists of a digital computer. The computer memory contains data regarding the location of target and reference points. Unit 24 includes as one of its functions the operation of digital signals to control the series 12 of mirror and drive assemblies to control deflection of the LOS axis of the laser energy beam. The series 12 of mirrors and drive assemblies also comprise the optical train for deflecting energy reflected back from objects in the path of the laser energy beam. The purpose of this feature of the optical train is to direct this energy to the electro-optical sensor input of the laser range receiver 18. Unit 24 also generates command signals calling for particular codes to be superimposed upon the individual laser beams projected at targets. These codes in turn cooperate with the receivers on the individual, launched laser-guided weapons to enable a particular weapon to go after its own designated target. The laser code generator 26 responds to the command signals from processor and command generator unit 24 and provides to the laser transmitter the laser codes superimposed upon a beam, and also provides the information concerning the code selected for a particular target to the laser range receiver 18. Another function of unit 24 is to correlate incoming target information with previous target information to discriminate between valid and spurious data. In doing this, it uses the range information received from laser range receiver 18. The operation of a digital computer to perform the various hereinabove described functions of processor and command generator unit 24 is well understood in the art, and in and of itself is not novel. There is an operative interconnections between series 12 of mirror and drive assemblies and processor and command generator unit 24. Namely, series 12 receive their deflection commands from unit 24.

By means of mode select panel 22, the operator may select any of the following three modes of operation of system 10:

1. Single track point;
2. Dual track point;
3. Multiple target tracking.

In mode 1, the operator selects the single point within the field-of-view of display 20 which would best keep the target area in the center of the display view. The location of targets with respect to that single point and with respect to an inertial reference (e.g. as obtained by calculations from previously collected reconnaissance data) has been previously stored within the memory of processor and command generator unit 24. Unit 24 continuously computes digital command signals for the series 12 of mirror and drive assemblies that will point the LOS axis of each laser energy beam at the target designated by the operator, and that will align the optical LOS axis of the optical train for receiving reflected energy with the respective beam. The code superimposed on the laser beam when its LOS axis is directed to a target will enable each guided weapon to go after its own unique target, as specified by the code. Suitable synchronism of the laser transmitter and the commands to the series 12 of mirror and axis drive assemblies is provided. In a typical operational system ten (10) pulses of laser beams per target per second would be projected. Thus, for the case of simultaneously attacking six (6) targets, the laser transmitter should project sixty (60) pulses per second. The mirrors of series 12 would be maintained in position long enough to allow laser energy reflected from the target to return, so that the mirrors can also function as the optical train for reviewing such reflected energy. The reflected energy is applied to the range receiver 18 which provides range to each target which is fed into the processor and command generator 24 for use in the correlation computations. The processor and command generator unit 24 generates symbols on display 20 representing the "track" of each designated target, and the operator may introduce revised data concerning their location by conventional means provided in connection with his control panel 22.

Mode 2 is similar, except that the two best tracking points within the field-of-view of the display are selected. For purposes of this description, the term "offset target" means that the location of the target is known with respect to the two track points, so that the two track points serve as the reference system from which target locations are measured (offset). The offset distances would usually be obtained by prior reconnaissance data. The second track enables such offset targets to be designated without requiring a precises reference as in mode 1. However, the processor and command generator unit 24 must have the range of each target with respect to the two track points previously stored in its memory. The latter can be derived from previously collected reconnaissance data. This mode does not need an inertial reference, as offet distances can be computed from the measured laser ranges.

Mode 3 does not require storing reference data on targets in the processor and command generator 24. Instead, it is based upon the operator observing each target in the display 20, and designating it to unit 24, and introducing updated information to the unit 24 to eliminate errors observed by discrepancy between the electronically imprinted symbolic target point which is generated by unit 24 and shown on the display 20, and the actual target seen on the display.

Modes 1 and 2 have the advantage that the operator need only see the track points and not the targets. They are of great use against small or camouflaged targets that cannot be seen due to poor contrasts, poor atmosphere conditions, long ranges, camouflages, or combinations of the above. Mode 3 is of optimum utility against "fleeting" targets where precise knowledge of the target is not available. Such targets include parked aircraft, parked pontoon bridges, and other mobile targets.

It will be appreciated that system 10 is an organization in which the utilization means for the series 12 of mirror and drive assemblies may be considered to be any of a number of the other elements of the system, or combinations of such elements. For example, the laser transmitter 17 may be considered to be the utilization means of the deflection control provided by series 12, since the energy beam which it projects is under the deflection control of series 12. Alternatively, laser range receiver 18 may be considered to be the utilization means of series 12, since the series constitutes the optical train for receiving the input for receiver 18, namely the laser energy reflected back from objects in the path of the laser beam. The output of laser range receiver 18 is fed to processor and command generator unit 24, where this information is used in the computation of correlations used in connection with the discrimination between valid and spurious target data as a still further alternative. Therefore, the organization consisting of the combination of laser range receiver 18 and unit 24 may be considered to be the utilization means of series 12.

Figure 2:
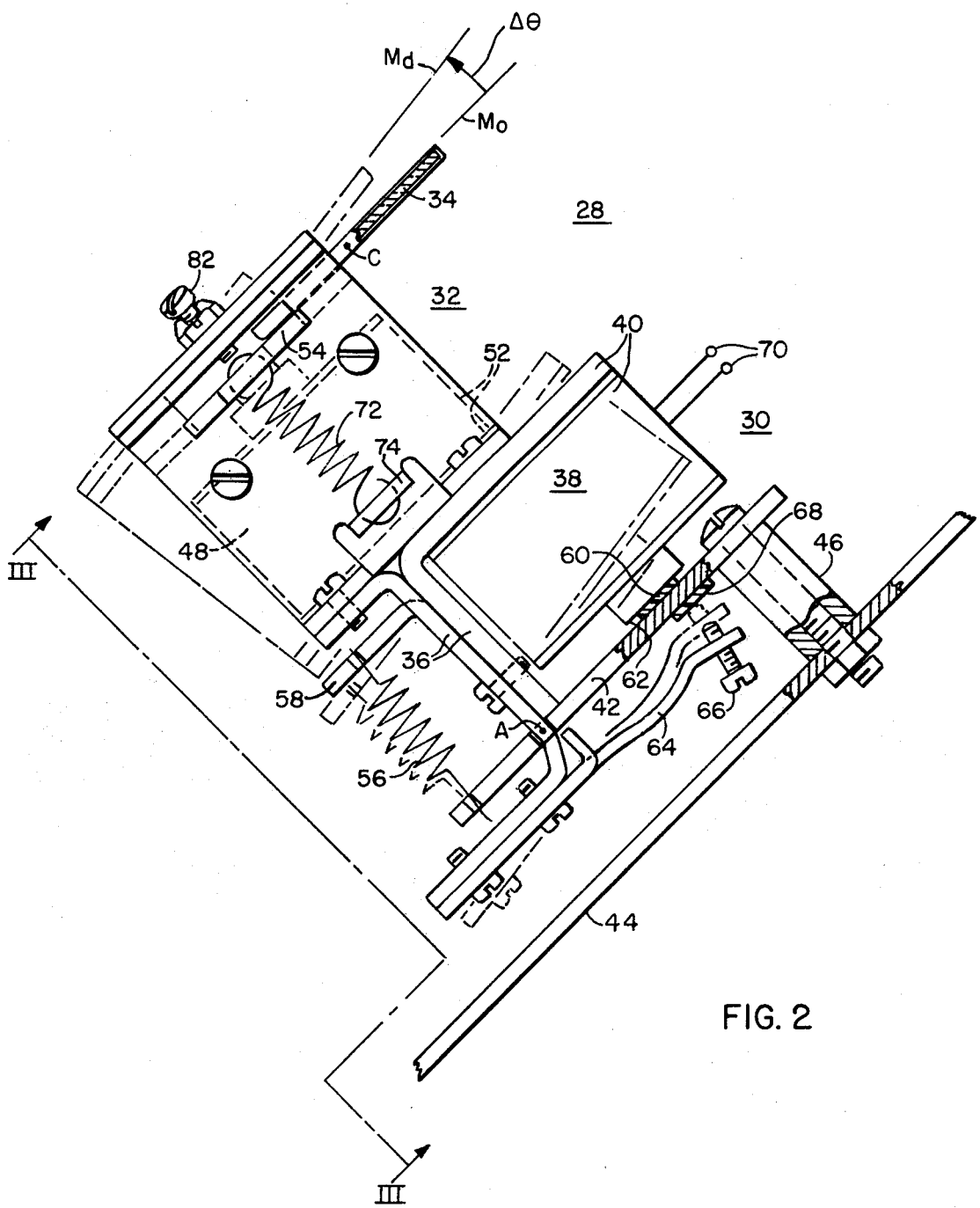
FIG. 2 is a top-plan view of a mirror and four position-two orthogonal axis drive assembly employed in the system of FIG. 1, and more particularly represents such an assembly with its parts in the attitudes they would assume if employed as the mirror station in FIG. 5 closest to the laser beam transmitter.
Figure 3:
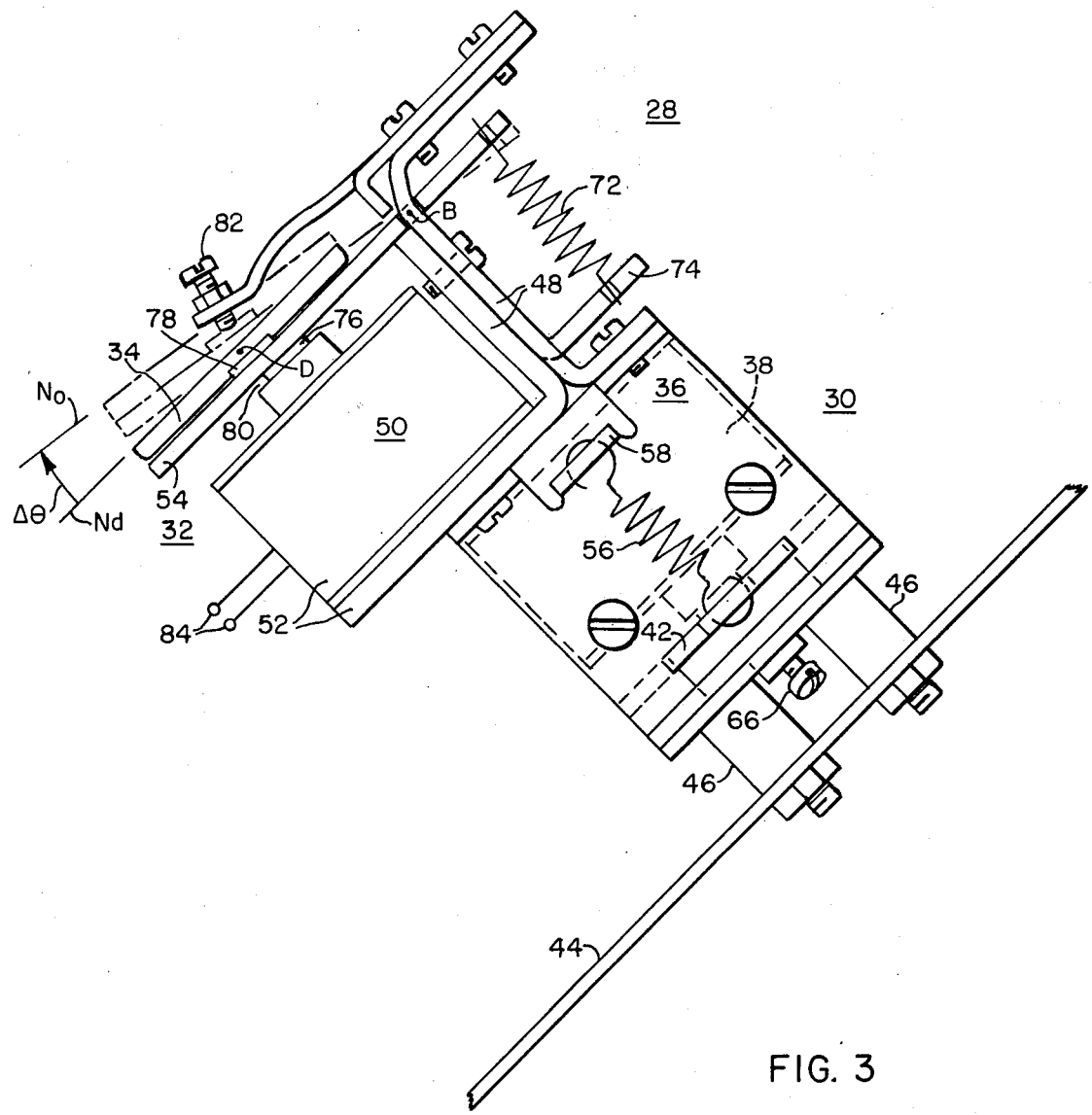
FIG. 3 is a side elevation taken in the direction of arrows III—III of FIG. 2.

Reference is now made to FIGS. 2 and 3 for a detailed description of a construction of a mirror and four position-two orthogonal axis drive assembly 28, which may be used in making the individual mirror and drive assemblies of series 12. Assembly 28 is constructed of two spring biased, solenoid and armature arm actuators 30 and 32, and a mirror 34. Mirror 34 is preferably ellipsoidal in shape, as will be better understood as the description proceeds. These solenoid powered actuators are readily available commercial units available for switch contact actuator applications. In the present instance, their mechanism is employed as drive mechanisms for providing bistable, pivotal deflection position control about a linear pivot axis. It is to be understood that the electrical signals for controlling assembly 28 are assumed to be electrical current signals which are either ON or OFF. It should be understood that the ON signal state and the OFF signal state, respectively, will not always represent the same deflection command. For example, an ON signal state applied to one of the solenoids may cause the mirror to be in the optical train boresight reference position. The same ON signal state applied to another solenoid may cause the mirror to be in its pivotally deflected position. Stated another way, in some of the mirror and four position-two axis drive assemblies of series 18 the application of an ON signal to an input terminal will cause the mirror to be positioned in its optical train boresight reference position; whereas in others the application of an ON signal will cause the mirror to be in its pivotally deflected position.

Now referring with particularity to FIG. 2, spring biased, solenoid and armature arm actuator 30 serves as a bistable deflection drive mechanism for deflection about a linear pivot axis, A. Since axis A is perpendicular to the plane of the drawing, it appears on the drawing as a point. The frame 36 and solenoid 38 of actuator 30 form a rigidly integral frame and solenoid unit 40. The actuator provides deflection actuation by relative movement between unit 40 and an armature arm 42 about axis A. Armature arm 42 is rigidly affixed to a support member 44 by means of posts 46. Solenoid 38 is sometimes hereinafter referred to as the "A-axis deflection solenoid."

Now referring with particularity to FIG. 3, spring biased, solenoid and armature arm actuator 32 serves as a bistable drive mechanism for deflection about another linear pivot axis, B. Just as in the case of actuator 30, its frame 48 and solenoid 50 form a rigidly integral frame and solenoid unit 52, and the deflection actuation is provided by the relative movement between unit 52 and an armature arm 54 about axis B. Unit 52 is affixed to the frame 36 of actuator 30. Solenoid 50 will sometimes hereinafter be referred to as the "B-axis deflection solenoid." Actuator 32 is oriented relative to actuator 30 such that linear pivot axes A and B are mutually orthogonal.

The mirror 34 is affixed to armature arm 54.

Particular reference is again made to FIG. 2 for a more detailed description of spring biased, solenoid and armature arm actuator 30 and its operation. A tension spring 56 is connected between a projecting arm portion 58 of frame 36 and an end of armature arm 42. Spring 56 resiliently urges frame and solenoid unit 40 away from engagement with armature arm 42. A deflection stop damper piece 60 made of a damping material is affixed onto armature arm 42 in confronting relationship to the pole face 62 of solenoid 38. An adjustment screw support arm 64, which is rigidly attached to the frame 40, carries an adjustment screw 66. Another deflection stop damper piece 68 also made of damping material is affixed onto armature arm 42 in confronting relationship to the adjustment screw 66. An ON current signal applied to electrical terminals 70 of A-axis deflection solenoid 38 causes the frame and solenoid unit 40 to be held with the solenoid pole face 62 against deflection stop damper piece 60 (i.e., the solid line position in FIG. 2). An OFF current signal applied to terminals 70 deenergizes solenoid 38. In this condition, spring 56 pulls the frame and solenoid unit 40, and in turn solenoid powered actuator 32 and mirror 34, into a position in which adjustment screw 66 is against deflection stop damper piece 68 (i.e., the phantom line position in FIG. 2).

In describing the operation of actuator 30, reference will be made to a geometric reference plane M which coincides with the surface of mirror 34 and which also has the geometric relationship of being a plane parallel to linear pivot axis A. (This plane is perpendicular to the plane of the drawing and therefore appears in the drawing as a line.) The position of geometric reference plane M when solenoid 38 is energized is defined as its reference position $M_0$. The deenergization of solenoid 38 causes deflection through what is essentially a counterclockwise deflection angle $\Delta \theta$ (determined by adjustment screw 66) to a predetermined pivotally deflected position, $M_d$, of reference plane M. This movement of reference plane M which is the same as the movement of the surface of mirror 34 about axis A, causes a predetermined incremental deflection of the LOS axis in the X-direction of sweep of the two-dimensional field-of-view of system 10. This will become apparent in connection with the subsequent description in conjunction with FIGS. 5 and 6. Reference position $M_0$ corresponds to the optical train boresight reference position of mirror 34, and $M_d$ corresponds to the pivotally deflected position of mirror 34 about axis A.

Particular reference is again made to FIG. 3 for a more detailed description of spring biased, solenoid and armature arm actuator 32 and its operation. Like the construction of actuator 30, actuator 32 has a tension spring 72 connected between a projecting arm portion 74 and an end of the armature arm 54. Deflection stop damper pieces 76 and 78 are affixed to armature arm 54 in confronting relation to the solenoid pole face 80, and in confronting relationship to an adjustment screw 82, respectively.

In describing the operation of actuator 32, reference will be made to another geographic reference plane N which coincides with the surface of mirror 34 and which is a plane parallel to linear axis B. An ON signal to B-axis deflection solenoid 50 holds mirror 34 in a position in which the geometric reference plane N is in its reference position $N_0$, defined by engagement of deflection stop damper piece 78 against pole face 80. An OFF current signal deenergizes solenoid 50 and spring 72 pulls armature arm 54 into a position with damper piece 78 in engagement with adjustment screw 82. This in turn causes a deflection of the geometric reference plane N through what is essentially a clockwise deflection angle, $\Delta \theta$. This position is defined as the deflected position $N_d$ of geometric reference plane N. This movement of plane N, which is the same as the movement of the surface of mirror 34, will cause a predetermined incremental deflection of the LOS axis in the Y-direction of sweep of the two-dimensional field-of-view system 10. Reference position $N_0$ corresponds to the optical train boresight reference position of mirror 34, and position $N_d$ corresponds to the pivotally deflected position of mirror 34, about axis B.

It will be appreciated that in the operation of mirror and four position-two axis assembly 28 there is essential independence of the positioning of the frame and solenoid unit 40 between its positions defining geometric reference plane positions $M_0$ and $M_d$, and of the positioning of armature arm 54 between its positions defining reference plane positions $N_0$ and $N_d$. This is because linear pivot axes A and B are mutually orthogonal axes.

It will be appreciated that the mirror and four position-two orthogonal axis drive assembly 28 cause some finite parallax due to its linear pivot axis A, FIG. 2, being displaced by a small distance of separation from the center of the mirror, represented by points C, FIG. 2. However, in application of LOS axis deflection control in which the useful length of the LOS axis is extremely long compared to such distances of separation, the parallax is so trivial that it may be disregarded. The reason for specially defining the term "pivotal deflection about a linear pivot axis" at the beginning of this specification will now be appreciated. This reason is to include with the scope of the meaning of that term the exact structural arrangement of the presently described preferred embodiment, as well as alternative embodiments in which the pivotal deflection axis or axes may pass through the center of the mirror.

The comments of the preceding paragraph have similar applicability to the operation of assembly 28 in producing LOS axis deflection in the Y-direction of sweep. In this case, the finite parallax is caused by the displacement of pivot axis B, FIG. 3, from the center of the mirror, represented by point D, FIG. 3.

Spring biased, solenoid and armature arm actuators 30 and 32 are of a type employing large drive currents in order to provide quick movement. The deflection stop damper pieces 60, 68, 76 and 78 are made of material which provides rapid damping. More details concerning the energy absorptive characteristics required of these damper pieces is given in a subsequent subdivision of this specification entitled "Case 1 -Collimated Laser Beam 2.0 Inches in Diameter."

The specific design of mirror and four position-two orthogonal axis drive assembly 28 which has been described employs the energized condition of the solenoids to drive the mirror in one direction, and spring force to return it in opposite directions. However, an alternate arrangement would be to reverse the current and thereby rely upon electrical drive for movement in either direction.

The mirror and four position-two orthogonal axis drive assembly which has been described is arranged to cause clockwise deflection of its geometric reference planes M and N away from their reference positions $M_0$ and $N_0$. Alternative arrangements providing counterclockwise deflection can be provided for one or both of the planes M and N, by reversal of the orientation of either or both of the actuators 30 and 32.

Reference is now made to FIG. 4 for a functional description of the operational inter-relationship between processor and command generator unit 24 and an individual mirror and four position-two orthogonal axis drive assembly 28. One of the functions of unit 24 is to control deflection of the LOS axis established by the mirrors of the series 18 of mirror and drive assemblies in a direction which causes the LOS axis to sweep in the X-direction of sweep. In performing this function, processor and command generator 24 sends either one or the other of an ON or OFF current signal to spring biased, solenoid and armature arm actuator 30 of assembly 28. An ON signal energizes the A-axis deflection solenoid 38 (FIG. 2) causing actuator 30 to be in its condition in which reference plane M is in the reference position $M_0$. As previously described the reference position $M_0$ of plane M corresponds to mirror 34 being in its optical train boresight reference position. An OFF current signal deenergizes solenoid 38 moving the M plane through a deflection angle $\Delta \theta$ to its deflected position $M_d$, and in turn causing mirror 34 to be in its pivotally deflected position. Processor and command generator unit 24 has a corresponding function in control of LOS axis deflection to cause the LOS axis to sweep in the Y-direction of the field-of-view. In performing the latter function, an ON current signal sent to B-axis deflection solenoid 50 establishes actuator 28 in the condition in which the N plane is in its reference position $N_0$. The OFF command establishes assembly 28 in the condition in which the N plane is in its deflected position $N_d$. It will be appreciated that mirror and four position-two axes drive mechanism which forcibly drives the mirror from any one to another of four positions consisting of combinations of two possible pivotal deflection positions of the mirror about each of its two mutually orthogonal linear pivot axes, A and B. Also, it will be appreciated that this has been achieved by effectively series coupling a pair of spring biased, solenoid and armature arm actuators with their respective pivot axes in a mutually orthogonal relationship.

Figure 5:
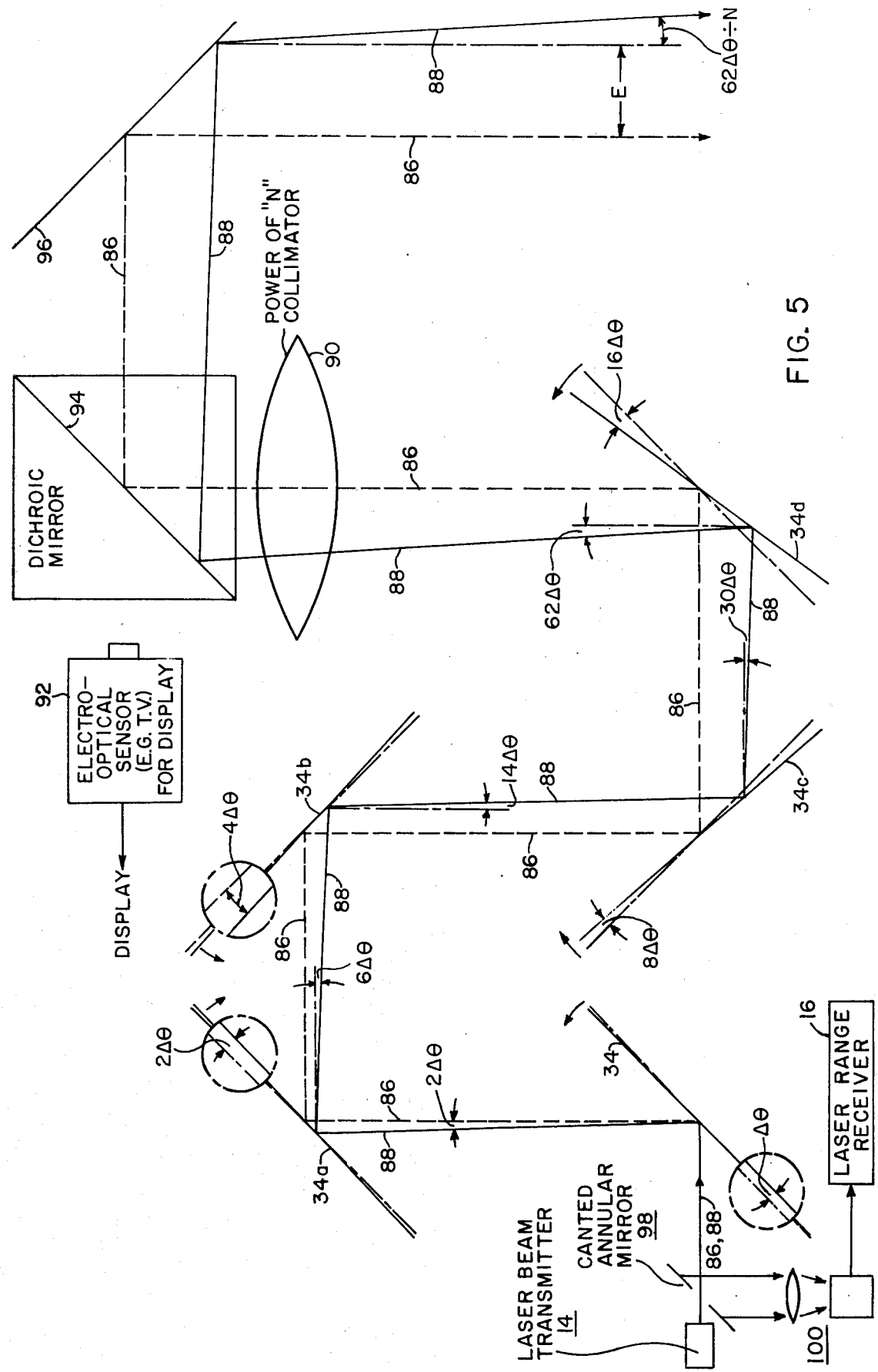
FIG. 5 is a conceptual schematic suggestive of a top plan view (assuming that the X-direction of sweep is a horizontal sweep) of the series of mirror and four position-two orthogonal axes drive assemblies of the multiple target designation system of FIG. 1, which FIG. 5 further contains inserts showing magnified views of deflections of mirror surfaces.

Referring now to FIG. 5, a series of five mirror and drive assemblies having the type of construction that has been described in conjunction with FIGS. 2, 3 and 4 have their respective mirrors 34, 34a, 34b, 34c and 34d arranged to provide a right angled, zig-zag arrangement of optical train boresight reference axis segments when each respective mirror is in its optical train boresight reference position, $M_0$. It is understood that the phantom positions of mirrors 34, 34a . . . 34d in FIG. 5 correspond to the condition in which the geometric reference planes M are in their initial reference position $M_0$. With the mirrors in these phantom line positions an LOS axis has equal 45° angles of incidence and reflection with each mirror face. Each mirror 34 is preferably ellipsoidal in order to accommodate the ellipsoidal area of beam impingement which is the result of arranging the mirrors for zig-zag reflection of the LOS axis. The advantages of using ellipsoidal mirrors are: (A) it minimizes the amount of mass which each four position-two orthogonal axis drive assembly must move, and (B) the mirror occupies less space. Dashed line 86 represents the optical train boresight reference axis of system 10.

Although the mirror and drive assemblies to which mirrors 34, 34a . . . 34c are mounted are all of basically the same type of construction, there are differences among them. Mirrors 34a and 34c deflect in the clockwise direction in going from their boresight reference positions to their deflection positions. Mirrors 34, 34b and 34d go in the counterclockwise direction. The angular distance from the optical train boresight reference position of mirror 34 to its pivotally deflected position is $\Delta \theta$. The angular distances for the rest of the series increase as a power of two.

For purposes of the description to be made in conjunction with FIGS. 5 and 6, the electrical signal for controlling the various A-axis deflection solenoids 38 (FIG. 2) which control the deflection mirrors 34, 34a . . . 34d is assumed to be a binary signal which is either in the "0" or "1" state. It is also assumed that the "0" state will be the appropriate signal (either ENERGIZE or DEENERGIZE depending upon the specific assembly 28) to cause the mirror to be in its optical train boresight reference position. The "1" state will cause the mirror to be in its pivotally deflected position.

FIG. 5 represents a portion of system 10 including series 12 of mirror and drive assemblies, in the condition in which "1" signals have been applied to the A-axis deflection solenoids of each mirror and drive assembly of the series. This condition(i.e., "1" applied to each assembly of the series) provides the maximum deflection of the LOS axis in the X-direction of sweep as follows. Mirror 34 is deflected by an angle $\Delta \theta$, (indicated in the inset shown on the drawing) so that the laser energy beam LOS axis represented by solid line 88 has an angle of incidence to the mirror surface which differs from that to mirror 34 in the phantom position of the latter by an angle $\Delta \theta$. The reflected angle has an equal and opposite change yielding a cumulative deflection of the LOS axis of 2 $\Delta \theta$ (indicated on drawing) as it comes off of surface of mirror 34. The mirror and drive assembly which carries mirror 34a is preset (by adjustment of screw 66, FIG. 2), to provide a mirror deflection of 2 $\Delta \theta$ (indicated on drawing). This causes an LOS axis deflection coming off the mirror of 6 $\Delta \theta$ (indicated on drawing). The mirror and drive assembly which carries mirror 34b is preset to provide a mirror deflection of 4 $\Delta \theta$ (indicated on drawing) causing an LOS axis deflection of 8 $\Delta \theta$, which added to the 6 $\Delta \theta$ deflection coming off mirror 34a yields a cumulative LOS axis deflection of 14 $\Delta \theta$ (indicated on drawing). The mirror and drive assembly which carries mirror 34c is preset to provide a mirror deflection of 8 $\Delta \theta$ (indicated on drawing) causing an LOS axis deflection of 16 $\Delta \theta$. This, added to the 14 $\Delta \theta$ deflection coming off mirror 34b, yields a cumulative LOS axis deflection of 30 $\Delta \theta$ (indicated on drawing) coming off 34c. The mirror and drive assembly which carries mirror 34d is preset to provide a mirror deflection of 16 $\Delta \theta$ (indicated on drawing) causing an LOS axis deflection of 32 $\Delta \theta$ This, added to the 30 $\Delta \theta$ deflection coming off mirror 34c, yields a cumulative LOS axis deflection of 62 $\Delta \theta$ (indicated on drawing) for the series of five (5) mirrors. A collimator 90, shown schematically, is disposed in the path of the LOS axis coming off mirror 34d. Its presence reduces the LOS axis deflection by a predetermined amount. (The scale of the drawing does NOT permit a schematic showing of the effects of collimator 90 upon the LOS axis line 88 as it passes through the collimator.)

It will be apparent that the resultant effect of having "1" binary signals applied to the A-axis deflection solenoids of mirror and drive assemblies of mirrors 34, 34a . . . 34d is to deflect the LOS axis of the laser energy beam at the exit aperture of the optical train by the angle 62 $\Delta \theta$ 34 N (indicated on drawing), where N is the power of the collimator. Note that the LOS axis of the laser beam is displaced by a parallax distance, E.

The reason for the modifier word "virtual" in the term "virtual axis of deflection of the LOS axis," defined at the beginning of this specification will now be appreciated. It can be seen that a desired deflection of the LOS axis by the combined effects of operation of series of mirrors 34, 34a . . . 34d has been provided, as though it occurred about an axis of deflection which is parallel to the linear pivot axes A of the four position-two orthogonal axis drive assemblies which drive the mirrors. However, this axis of deflection is virtual. It is not an axis which can be identified in terms of the structure of the series of mirrors.

FIG. 6 depicts the same system as shown on FIG. 5 except that its series of mirrors 34, 34a . . . 34d have a different combination of "0" and "1" signals applied thereto. Mirrors 34, 34b and 34d have "0" signals applied to the A-axis deflection solenoids of their respective mirror and four position-two orthogonal axis drive assemblies. Mirrors 34a and 34c have "1" signals applied to their A-axis deflection solenoids. Mirror 34 is in its optical train boresight reference position, which reflects the laser energy beam LOS axis 88 without deflection. Mirror 34a has a deflection of 2 $\Delta \theta$ (indicated on drawing) which causes an LOS axis deflection of 4 $\Delta \theta$ (indicated on drawing) coming off the mirror. Mirror 34b is in its optical train boresight reference position and therefore reflects the LOS axis maintaining the angle of deflection of the LOS axis the same as it was before it impinged against the mirror 34b, namely, an LOS axis deflection angle of 4 $\Delta \theta$ (indicated on drawing). Mirror 34c has a deflection of 8 $\Delta \theta$ (indicated on drawing) resulting in the deflection of the line-of-sight by 16 $\Delta \theta$, which when added to the previous 4 $\Delta \theta$ deflection, yields a cumulative deflection of 20 $\Delta \theta$ (indicated on drawing) coming off mirror 34c. Mirror 34d maintains this same LOS axis deflection so that the exit LOS axis deflection coming from the series of five (5) mirrors is 20 $\Delta \theta$. The total angle of deflection of the LOS axis of the laser beam coming off the spatially stabilized mirror 96 is 20 $\Delta \theta = N$ (indicated on drawing). The distance of parallax E' coming off mirror 96 is shorter than that which resulted in the case of the mirror positions shown in FIG. 5.

FIGS. 5 and 6 depict the deflection of the LOS axis in the X-direction of sweep of the field of view of target designation system 10. Simultaneously, commands are also applied to the B-axis deflection solenoids 50 (FIG. 3) of the mirror and four position-two orthognal axis drive assemblies, providing simultaneous control of the LOS axis in the Y-direction of sweep.

Assume that the smallest mirror displacement desired is $\theta$ which for example, may be one-half a laser beam width. The minimum LOS displacement is double the mirror movement, or $2 \Delta \theta$. It can be shown that by proper selection of the positions of each mirror of the series, one can position the LOS axis anywhere within a total angle of $2 [(2^N) - 1] \Delta \theta$ in angular deflection about the axes of deflection of the LOS axis, where N is the number of mirrors in the series.

Reference is again made to FIG. 5, this time for a description of certain elements of system 10 other than the mirrors and collimator. Electro-optical sensor unit 92 (typically a television camera), dichroic mirror surface 94, and spatially stabilized mirror 96 are elements of the electro-optical sensor, optics and stabilization unit 12 of FIG. 1.

A canted annular mirror 98 is fixedly disposed between laser beam transmitter 14 and the first mirror 34 of series 12. Its purpose is to collect reflected laser energy for laser range receiver 18. The surface of mirror 98 is canted at an angle of 45° to the optical train boresight reference axis. The size and shape of its central opening of mirror 98 is chosen to permit the outwardly projected laser energy beam to pass therethrough. The mirrors of series 34, 34a . . . 34d, and spatially stabilized mirror 96, are all sufficiently oversized relative to the crosssectional size of the transmitted laser beam to be able to direct reflected energy back to annular mirror 98 without interference with the outgoing laser energy beam. For example, for an outgoing laser beam diameter of ¼ inch (6.35 mm), mirror 98 would typically be of annular shape with an outside diameter of ⅜ inch (9.525 mm) and a diameter of its central opening of ¼ inch (6.35 mm), and the series of mirrors 34, 34a . . . 34d, and spatially stabilized mirror 96 would be made sufficiently oversized relative to the needs of the optical train for deflection of outgoing beams to provide impingement of sufficient energy against the surface of mirror 98 for operation of laser range receiver 18. Examples of suitable dimensions of these mirrors in order to provide this function are given in the subsequent subdivisions of this specification entitled "Case 1-Collimated Laser 2.0 Inches in Diameter" and "Case 2-Raw Laser Beam 0.25 Inches in Diameter." Canted mirror 98 directs the reflected laser energy to an electro-optical sensor unit 100 (including a lens system). Sensor unit 100 comprises the input of the laser range receiver 18, as schematically depicted in the drawing. A conventional dichroic mirror surface 94 reflects laser energy, but passes other components of optical energy without reflection. The dichoic mirror surface 94 is canted at an angle of 45° to the optical train boresight reference axis.

The reason that the mirrors 34, 34a . . . 34d are effective in directing laser energy reflected back from objects in the path of the laser beam will now be appreciated. The deflection of the optical LOS is controlled by commands which are applied to the A-axes and B-axes solenoids 38 and 50 of series 12 of mirror and drive assemblies. These commands are generated by processor and command generator unit 24. The command signals are such that they hold the mirrors of series 12 in their commanded condition of deflection long enough to deflect laser beam energy reflected back from the object. The reflected energy is then directed back along a reflected energy LOS axis segment (not shown) which provides the same magnitude of total deflection (but opposite direction) as provided in connection with the outgoing beam. This, in turn, causes the reflected energy to be accurately directed against reflected laser energy collection mirror. Of course, the direction of the outgoing beam constitutes the incoming line-of-sight direction of maximum reflective energy of the projected beam.

It will now be appreciated that series 12 of mirror and drive assemblies and the other elements which are operatively involved in controlling the outgoing laser energy beam and in controlling the incoming laser energy reflected from objects in the path of the laser beam constitute an optical train unit 102. Besides the deflection control mirrors, the other element of optical train unit 104 consists of collimator 90, dichroic mirror 94, spatially stabilized mirror 96, and reflected laser energy collection mirror 98. The spatially stabilized mirror 96 is the aperture element of optical train unit 102, serving both as the exit aperture for the egress of the outgoing laser beam and the entrance aperture for the ingress of laser energy reflected from objects in the path of the laser beam.

The reason for special definition of the term line-of-sight axis at the beginning of this specification will now be apparent. It will be recalled that line-of-sight axis was defined to include both: (A) the axis of an energy beam, and (B) an optical line-of-sight axis through an optical train. The preceding paragraphs have disclosed the operation of mirrors 34, 34a . . . 34d (FIGS. 5 and 6) to deflect the LOS axis 88 of the laser energy beam. The preceding paragraphs have also described the operation of the same series of mirrors as an optical train which operates with the same deflection control to direct laser energy reflected from objects in the path of the energy beam to the input of the laser range receiver. The reason for the special definition of the term line-of-sight axis is to include within the scope of its meaning both of these cases, both of which exist in the present preferred embodiment.

The electro-optical sensor unit 92 is disposed behind the dichoic mirror surface in an alignment with the segment of optical train boresight reference axis 86 between dichroic mirror 96 and spatially stabilized mirror 96. This enables sensor 12 to receive optical energy which passes through the surface. Thus, the electro-optical sensor unit 92 and the laser transmitter 14 make combined use of spatially stabilized mirror 96.

EXEMPLARY MIRROR SIZES, DRIVE REQUIREMENTS AND DAMPING CONSIDERATONS

It is apparent from the preceding description that the mirrors of the series of mirror and drive assemblies must increase in cross-sectional size in the direction of propagation of the laser energy beam due to beam divergence and deflection. Also, the spring biased, solenoid and armature actuator units must be quick-acting. The following two subdivisions of the specification present exemplary mirror size growth calculations for laser energy beam divergence and deflection, and exemplary calculations of necessary deflection drive force. These calculations are developed for two cases as follows:

Case 1. The laser energy is a collimated beam which is two (2) inches (5.08 mm) in diameter and which exhibits 0.5 milliradian (mr.) divergence.

Case 2. The laser energy beam is a "raw" beam which is 0.25 inches (6.35 mm) in diameter and which exhibits 4.0 (mr.) divergence.

Calculations for each case are made for a maximum deflection capability of 64.0 (mr.) after collimation and based upon a seven (7) mirror, two (2) axis system. (This is approximately 3.64°.) It is assumed that no collimation in the chain will be required for Case 1, whereas an eight (8) power collimator 90 (FIGS. 5 and 6) is deemed required for Case 2. An eight (8) power collimator provides collimation equal to the divergence along the seven mirrors. It will be apparent that the raw beam in Case 2 will be deflected at significantly greater angles from mirror to mirror than for Case 1. A distance of 0.1 inches (2.54 mm) between mirrors is assumed.

As hereinbefore described, the series of mirrors is made oversize to function to control the laser energy reflected from objects in the path of the outgoing laser beam in order to direct this reflected energy to reflected laser energy collection mirror 98. The exemplary calculation for Case 1 will include calculation of suitable mirror dimensions to provide this function.

The calculations for Case 1 still further include a discussion of the energy absorptive qualities of damper pieces 60, 68, 76 and 78 (FIGS. 2 and 3).

The exemplary calculations for Case 2 will further include an example of a suitable dimension of the mirrors to direct the reflected laser energy to annular collection mirror 98 (FIGS. 5 and 6) for that case.

CASE 1 – COLLIMATED LASER BEAM 2.0 INCHES IN DIAMETER

This is the case of a collimated beam which is 2 inches (50.8 mm) in diameter and which exhibits 0.5 mr. of divergence and, therfore, requires no collimation. The first mirror may move the line-of-sight (LOS) 0.5 mr., and the mirror moves 0.25 mr. The beam is diverging at 0.5 mr. The mirror must be large enough to accommodate the two components of possible area of impingement of the energy beam consisting of the 0.5 mr. divergence, plus 0.25 mr. movement. The minimum size of the mirror required to accommodate this is an ellipse, with a major axis of 2.82 inches (71.6 mm) and a minor axis of 2.002 inches (50.85 mm).

The second mirror moves 0.5 mr. to deflect LOS axis 1.0 mr., and must accommodate the 0.5 mr. diverging beam from any of the previous mirror positions. The second mirror grows slightly, to a minor axis of 2.006 inches (51 mm), and a major axis of 2.826 inches (72 mm).

The third mirror moves 1.0 mr. to deflect the LOB axis 2.0 mr., and must accommodate the 0.5 mr. diverging beam from any of the previous mirror positions. The growth of approximately 0.004 × 2.1 inches to a minor axis of 2.015 inches (51.1 mm) and to a major axis of 2.840 (72.1 mm).

The fourth mirror moves 2.0 mr. to deflect the LOS axis 4.0 mr., and must accommodate the LOS axis motion and the diverging beam of any of the previous mirror positions. This gives (2.015 + 0.1) (0.017) inch growth to 2.032 inches (51.6 mm) for the minor axis, and 2.864 inches (72.9 mm) for the major axis.

The fifth mirror moves 4.0 mr. to deflect the LOS axis 8.0 mr. This gives (2.032 + 0.1) (0.016) inch growth to 2.064 inches (52.5 mm) for the minor axis, and 2.912 inches (74 mm) for the major axis.

The sixth mirror moves 8.0 mr. to deflect the LOS axis 16.0 mr. This gives (2.064 + 0.1) (0.032) inch growth to 2.134 inches (54.2 mm) for the minor axis, and 3.012 inches (76.5 mm) for the major axis.

The seventh mirror moves 16.0 mr. to deflect the LOS axis 320 mr. This gives (2.234) (0.064) inches for growth of the minor axis to $2.134 + 0.142 = 2.276$ inches (57.8 mm), and a growth to 3.212 inches (81.5 mm) for the major axis.

In summary, movement of the LOS through a seven mirror chain has the minor axis of the mirrors growing from 2 inches (50.8 mm) to 2.234 (56.8 mm).

By making each mirror (including spatially stabilized mirror 96 which as hereinbefore stated is the aperture element of optical train unit 102) oversized to provide a 3.0 inch (76.3 mm) minor axis, the mirrors will be able to direct reflected laser energy by their outer perimeters to the annular reflected energy collection mirror 98 (FIGS. 5 and 6). Stated another way, the return energy obtainable from the part of a mirror 96 having a minor axis dimension of 3.0 inch (76.3 mm) which is not used by the approximately 2 inch (50.8 mm) transmitted beam is adequate to provide the necessary signal intelligence for laser range receiver 14.

The above calculations are based on a 5% margin between mirrors, which is a reasonable manufacturing tolerance and on the approximation that the growth in a beam spreading by an angle $A_1$, and hitting a mirror at a total angle of $2 B_1 + A_1$. Thus, let $A_1$ be the divergence for the first mirror and $B_1$ be the mirror movement. For the second mirror, $A_2$ is $A_1 + B_1$ and $B_2$ is the mirror movement. These numbers give a reasonable approximation of an actual layout.

The critical drive solenoids are those required for the mirror that must move the largest amount. In the example cited, this is 16 milliradians. For a mirror having a 3.0 inch (76.3 mm) minor axis, this is 16 mr. movement of a 4.25 inch (108 mm) major axis essentially pivoted at the center. The actual motion is (4.25/2) 0.016 inches, or 0.034 inches. Consider that 10 milliseconds are available to move the mirror. Let 2 milliseconds be taken up with accelerating up to maximum acceleration a. Then 0.034 inches = ½ $a$ $(0.008)^2$, where $a$ is the acceleration in inches/sec². $a = (0.068/0.008) 2 - 1.06 \times 10^3$ inches/sec² = 88.5 ft/sec². (27 m/sec²) = 2.7 gees. Small solenoids are readily commercially obtainable which can provide sufficient force to move the weight of a beryllium backed mirror and the pivoting structure shown in FIGS. 2 and 3 with 2.7 gees of acceleration. The impact velocity of the solenoid element and armature piece is given by $V = a\ t = (1.06 \times 10^3)\ 0.008 = 8.48$ inches/sec (215 mm/sec). The material chosen for limit stops 60, 68, 76 and 78 (FIGS. 2 or 3) must have sufficient energy adsorption by conventional calculations. Such materials are also readily commercially available.

CASE 2 — RAW LASER BEAM 0.25 INCHES IN DIAMETER

This is the case of a "raw" beam which is 0.5 inches (12.7 mm) in diameter and which exhibits 4 mr. of divergence. Assume that there is 8 power collimation after the seven mirrors, so that the deflection of each mirror must be eight times that of Case 1. A similar analysis of line-of-sight growth, starting with 0.25 inches (6.35 mm) for the input beam gives the results shown in Table 2.

Table 2

| | | Mirror and Beam Sizes | | | |
|---|---|---|---|---|---|
| Mirror No. | Beam in Inches | Expansion Beam (mr.) | Expansion Mirror (mr.) | Mirror Size (Inches) | Beam Out (Inches) |
| 1 | .25 | 8 | 6 | .252 | .252 |
| 2 | .252 | 16 | 12 | .256 | .256 |
| 3 | .256 | 32 | 24 | .263 | .265 |
| 4 | .265 | 64 | 48 | .276 | .282 |
| 5 | .282 | 128 | 96 | .303 | .318 |
| 6 | .318 | 256 | 192 | .364 | .402 |
| 7 | .402 | 512 | 384 | .526 | .640 |

The terms expansion beam and expansion mirror are used to denote the increasing size of the beam and mirror. This expansion is due to two causes: 1) the beam is "spreading" (diverging) from its original size of 0.25 inches (6.35 mm) at a 2 mr. rate, 2) the possible location of the diverging beam increases with each mirror, since each mirror can deflect the beam through an increasing (expanded) angle. The term "expansion mirror" thus denotes the possible increased size of the expanding beam location to which the next successive mirror must be expanded in order to accommodate the beam. The mirrors grow from approximaely 0.25 inches (6.35 mm) to 0.526 inches (13.4 mm). Collection of reflected energy from the field-of-view can be obtained by increasing the first 5 mirrors to the size of the sixth mirror.

The size of the optical aperture element of optical train unit 102, FIG. 5, namely the size of spatially stabilized mirror 96, is determined by the size of collimator 90. As is well known in the art, the diameter of collimator required, for a factor of eight collimation, is 0.64 inches × 8 of approximately 5.12 inches (130 mm) in diameter. Thus, it will be appreciated that the size of the output aperture can be significantly reduced by reducing the power of the collimation. For example, a reduction of the power of collimator 90 from 8.0 to 5.026 will significantly decrease the size of mirror 96. An alternative way to reduce the size of mirror 96 is to eliminate the last mirror of series 12, as this is the one causing the biggest growth in the optical train aperture.

EXEMPLARY LASER BEAM PRFs

The samll mirrors of Case 2 lend themselves to target designation systems which operate with high laser beam pulse rates to enable simultaneous target designation for a large number of targets. As stated hereinbefore, a typical operational embodiment requires at least 10 (ten) pulses of laser beam per second per target. The significance of the high prf capability using small mirrors may be appreciated if one considers the mechanical requirements of a 1000 cps. system (which would have a capability of handling 100 targets). A *prf* of 1000 cycles/second would require motion in a time of 0.008 sec. Consider mirror 1, of Table 2, which has a size of 0.353 inches for the major axis. Consider a 2 mr. motion of the mirror. This gives (0.353/2) 0.002 = 0.00035 inches (0.0089 mm) motion.

The acceleration is given by $(0.0007/0.008^2) = 1.1 \times 10^3$ in/sec.$^2$ = 2.7 gees, as stated before. The solenoid size is reduced, as the mass of the small mirror is approximately 1% of the 3 inches mirror considered in Case 1. Therefore, *prf*'s of the order of 1000 cycles/second are practical, provided two constraints are met:
1. small mirrors (e.g., less than 0.5 inches);
2. small angles (e.g., less than 0.25 degrees).

ALTERNATIVE EMBODIMENTS AND MODIFICATIONS

In the embodiment illustrated, the optical train boresight reference axis is established as the LOS axis path existing as the result of application of "0" signals to all the A-axis solenoids and to all the B-axis solenoids. This results in the optical train boresight reference axis, being directed toward a corner of the rectangular field-of-view of the X-direction and Y-direction sweeps. However, it should be appreciated that the boresight reference axis, could alternatively be established as the center of the field-of-view, or any other location therein. Whatever location is established as such reference axis is merely a matter of choice. The processor and command generator unit 24 must be provided with logic for cartesian coordinate calculations which are appropriate for whatever locations of the reference axis is chosen.

The invention has been illustrated by an embodiment in which the increment of angular distance between pivotal deflection limits established at each successive mirror station is increased as a power of two. Also, this increase has been introduced in a monotonically increasing series in the direction of the projection of the energy beam. For many applications this is optimum because it minimizes the overall parallax produced by the series of mirrors. However, it should be appreciated that the deflection increment could alternatively be adjusted to accommodate other digital number systems, such as octal. Also, the deflection increment could alternatively be introduced in an order other than the monotonically increasing series.

The invention has been illustrated by a structural arrangement in which both of the linear pivot axes, axis A and B, (FIGS. 2 and 3) of each four position-two orthogonal axis drive assembly 28 (FIGS. 2 and 3) are displaced by a small distance of separation from the center of the associated mirror. However, it should be appreciated that structural arrangements having other locations of pivot axes relative to the center of the mirror are within the scope of the invention. For example, by positioning the center of the mirror over the fulcrum of the solenoid armature arm to which the mirror is attached, it is within the skill of the art to mount the mirror of each assembly 28 such that one of the pivot axes essentially passes through the center of the mirror. As another example, it is within the skill of the art to provide results which are useful for some purposes by mounting the mirror in a pair of gimbel rings having both their mutually orthogonal pivot axes passing through the center of the mirror. In a gimbel ring embodiment of this type, suitable actuators would be connected to crank arms on the respective gimbel rings.

The invention has been described with reference to its application to a target designator system 10 which directs the LOS axis of laser beam energy to specific targets, and which directs the laser energy reflected from the field-of-view to the reflected laser energy collection mirror 98. However, it should be appreciated that the invention may be employed in any applications in which it is desired to controllably deflect a LOS axis by digital signals. Examples of such other applications include:
1. Digital stabilization of the optical LOS axis of an optical train;
2. Digital closed-loop optical tracking, and
3. Digital scanning.

I claim:
1. Apparatus for controlling angular deflection of a line-of-sight (LOS) axis in each of two predetermined mutually orthogonal directions of deflective sweep, said apparatus comprising:
   a. a series of mirrors, each pivotally mounted for movement about first and second orthogonally related linear pivot axes which constrain the mirrors to deflect the LOS axis in one and the other, respectively, of said two mutually orthogonal directions of deflective sweep,
   b. the mirrors of the series of mirrors being so arranged to define an LOS axis path composed of path segments reflected from one to another of successive mirrors of the series, and
   c. each mirror of said series having operatively connected thereto a means for selectively driving the mirror between any one to any other of four predetermined positions, said four predetermined positions consisting of combinations of two predetermined pivotal deflection positions about the first linear pivot axis of the mirror and two predetermined pivotal deflection positions about the second linear pivot axis of the mirror.

2. Apparatus in accordance with claim 1, wherein:
   a. each mirror of said series having one of its four predetermined positions established as a boresight reference position of the mirror, and
   b. said series of mirrors, when in their respective boresight reference positions, establish an apparatus boresight reference axis which is directed against each successive mirror with a 45° angle of impingement and is reflected off same with a 45° angle of reflection.

3. Apparatus in accordance with claim 1, wherein:
   a. each means for selectively driving the mirrors between predetermined positions operatively connected to each mirror of the series comprises first and second deflection actuators, said first mirror deflection actuator comprising two parts which are movable relative to one another about the first linear pivot axis, said second mirror deflection actuator comprising two parts which are movable relative to one another about the second linear pivot axis,
   b. one of said first and second deflection actuators of each means for driving the mirrors is affixed to a rigid mounting structure by one of said parts thereof,
   c. the other of said first and second deflection actuators of each means for driving the mirrors is affixed to the other movable part of said one deflection actuator by one of said parts of said other mirror deflection actuator, and
   d. the connected mirror is affixed to the other of said parts of said other deflection actuator.

4. Apparatus in accordance with claim 1, wherein:
   a. each means for selectively driving the mirror between predetermined positions operatively connected to each mirror comprises first and second solenoid and armature arm actuators of a type which operate upon the principle of relative movement between a solenoid and an armature arm about a linear pivotal axis, and
   b. said first and second solenoid and armature arm actuators of each means for driving the mirror being mechanically series-coupled together and their respective linear pivot axes forming the first and second orthogonally related pivot axes for the connected mirror.

5. Apparatus for controlling angular deflection of a line-of-sight (LOS) axis about first and second orthogonally related virtual axes of deflection in response to said first and second, respectively, of two series of simultaneously present digital signals, the number of digital signals in each series being a predetermined number N, said apparatus comprising:
   a. a series of N pivotally mounted mirrors,
   b. the mirrors of the series of pivotal mounted mirrors being so arranged to define an LOS axis composed of segments reflected from one to another of the successive mirrors of the series,
   c. the mirrors of the series each having first and second predetermined pivotal deflection positions about a first linear pivot axis parallel to said first virtual axis of deflection,
   d. the mirrors of said series each having predetermined first and second pivotal deflection positions about a second linear pivot axis parallel to said second virtual axis of deflection,
   e. first means connected to each mirror of the series for selectively positioning the mirror at either one or the other of the first and second predetermined pivotal deflection positions about said first linear pivot axis in accordance with the state of the corresponding digital signal of the first series of simultaneously present digital signals, and
   f. second means operatively connected to each mirror of the series for selectively positioning the mirror at either one or the other of the first and second predetermined pivotal deflection positions about said second linear pivot axis in accordance with the state of the corresponding digital signal of the second series of simultaneously present digital signals.

6. Apparatus in accordance with claim 5, wherein:
   a. the digital signals of said first series of digital signals represent a digital number word and the angular distance of deflection between said first and second pivotal deflection positions about said first linear pivot axis for each mirror is proportional to the digital number system position value of the corresponding bit of said digital number word, and
   b. the digital signals of said second series of digital signals represent another digital number word, and the angular distance of deflection between the first and second pivotal deflection positions about said second linear pivot axis for each mirror is proportional to the digital number system position value of the corresponding bit of said another digital number word.

7. Apparatus in accordance with claim 6, wherein:
   a. the digital number words which the first and second series of digital signals represent are binary number words, and the individual digital signals of each of said first and second series of signals represent binary digits,
   b. whereby the LOS axis can be deflected within a total angle of $2[(2^N)1]\Delta\theta$ in angular deflection about each said virtual axis of deflection where $\Delta\theta$ is the minimum angular distance of deflection between the first and second predetermined mirror deflection positions of the mirror which corresponds to the least significant binary digit of each binary number word.

8. For use in an energy beam echo-ranging system, apparatus for controlling angular deflection of a line-of-sight (LOS) axis, in each of two predetermined mutually orthogonal directions of deflective sweep, said apparatus comprising:
   a. an energy beam projector operative to project a beam of radiant energy,
   b. an optical train aperture means through which the energy beam egresses along its external path of propagation and through which energy reflected back from external objects in the path of the energy beam ingresses,
   c. a series of mirrors disposed between said energy beam projector and said optical train aperture means, each mirror of the series being pivotally mounted for movement about first and second orthogonal related linear pivot axes, which constrain the mirrors to deflect the LOS axis in one and the other, respectively, of said mutually orthogonal directions of deflective sweep,
   d. the mirrors of said series being so arranged to define an LOS axis path composed of path segments reflected between the individual mirrors of the series,
   e. each mirror of the series having operatively connected thereto a means for selectively driving the mirror between any one to any other of four predetermined positions, said four predetermined positions consisting of combinations of two predetermined pivotal deflection positions about the first linear axis of the mirror and two predetermined pivotal deflection positions about the second linear pivot axis of the mirror,
   f. annular means for collecting energy reflected from external objects in the path of the energy beam, said annular means being disposed between the energy beam projector and the series of mirrors, said annular means having a central opening with its axes coaligned with the LOS axis of the energy beam being projected by the energy beam projector,
   g. the central opening of said annular means having a cross-sectional size sufficient to permit the energy beam to pass therethrough from the energy beam projector to the series of mirrors, and
   h. each mirror of said series of mirrors and said optical exit aperture optical element means having crosssectional sizes greater than the cross-sectional size of the energy beam to thereby direct energy reflected from objects in the path of the energy beam to the annular means for collecting such reflected energy.

9. Apparatus in accordance with claim 8, wherein:
   a. said annular means for collecting reflected radiant energy is a canted annular mirror.

10. Apparatus for controlling angular deflection of a light beam comprising: a plurality of mirrors in optical series for deflecting said light beam, each pivotally mounted for movement between two positions on each of first and second mutually orthogonal axes, and respective mirror actuators for driving each mirror between each of said positions on each axis.

* * * * *